United States Patent [19]

Swift et al.

[11] 4,008,483

[45] Feb. 15, 1977

[54] FILM CASSETTE

[75] Inventors: William R. Swift, Placentia; James Michael Marsh, Yorba Linda; Clyde E. LeFevre, Orange, all of Calif.

[73] Assignee: Addressograph Multigraph Corporation, Cleveland, Ohio

[22] Filed: Sept. 22, 1975

[21] Appl. No.: 615,474

[52] U.S. Cl. .............................. 354/277; 206/455
[51] Int. Cl.² ........................................ G03B 17/26
[58] Field of Search .......... 354/275, 276, 277, 180; 250/468, 470, 471; 206/454, 455

[56] References Cited

UNITED STATES PATENTS

| | | | |
|---|---|---|---|
| 2,483,578 | 10/1949 | Gallistel | 354/180 |
| 3,607,283 | 9/1971 | Gold | 354/276 X |
| 3,715,158 | 2/1973 | LeFevre et al. | 355/27 |
| 3,909,836 | 9/1975 | Vane | 354/276 |

*Primary Examiner*—R. L. Moses
*Attorney, Agent, or Firm*—Sol L. Goldstein; Michael A. Kondzella

[57] ABSTRACT

A cassette is provided for manually transporting a sheet of photographic film from one station to another without exposing the film to ambient light. The cassette comprises a light-tight enclosure provided at one end with a pair of rollers and at the other end with a resilient light seal. The rollers are adapted to be rotated in response to engagement with driven rollers associated with one station for advancing a film sheet into the cassette. The film sheet is positioned within the enclosure with a lead end thereof protruding from the resilient light seal. The cassette is then carried to another station where the lead end of the film is adapted to be inserted into a pair of driven rollers associated with another station for withdrawing the film sheet from the cassette.

10 Claims, 3 Drawing Figures

FILM CASSETTE

BACKGROUND OF THE INVENTION

The device of the present invention is adapted to receive an exposed sheet of photographic film from a camera for delivery of the film to a processor without the need for a darkroom. More particularly, the device may be utilized with a microfiche camera processor as shown, for example, in U.S. Pat. No. 3,715,158.

The reference patent discloses an apparatus using a single sheet film pack that has a light proof protective cover for protecting the photographic sheet from ambient light. The front end of the film pack is inserted through a film slot into the dark chamber of the apparatus, with registry holes of the film pack being engaged by pins of a film carriage.

At this time a gentle tugging of the film pack end that still projects outside of the film slot removes the protective cover and the film sheet is ready to receive photographic images corresponding to the data on copy sheets. The film carriage, and its now associated film sheet, is indexed to different locations for receiving subsequent such images.

When the film sheet is filled with such images, it is removed from the film carriage while still in the dark chamber, and is transported to a film developing unit within the machine for developing the images on the film sheet. When this has been completed, the finished microfiche is deposited in an external output receptacle.

While the foregoing device has been favorably received and produces high quality work, because it is a combined camera and processor unit for exposing and developing the film within a single machine, it does not provide for removal of the exposed film from the camera and transport of the film to a separate processor without exposing the film to ambient light unless, of course, the operation is performed in a darkroom.

SUMMARY OF THE INVENTION

There are various applications wherein it is desirable that the film be exposed in a camera at one station and then delivered to a developing or processor unit at another station for subsequent development of the film. Although protective covers for the film are known, as described in the above patent, to permit light-tight handling of the film during insertion of the film into the camera, applicants are now aware of any such devices for handling the film after exposure and prior to development without exposing the film to ambient light.

Accordingly, it is an object of the present invention to provide a cassette for receiving an exposed sheet of photographic film from a camera at one location and delivering the film to a processor at another location without the need for a darkroom.

Another object of the invention is to provide a cassette for accepting a sheet of film in a dark enclosure, from a pair of driven rollers of the camera, and for transporting the cassette in daylight to a pair of driven rollers associated with a processor unit for extracting the film from the cassette, while exposing only a lead end of the film to light in the process.

A feature of the invention is to provide a film cassette which is simple in construction, economical to produce, convenient to use and reliable in operation.

The foregoing objects are attained by providing a cassette comprising a dark enclosure having a pair of rollers forming a light seal at one end, and a non-scratching or non-marring resilient seal at the other end. When the cassette is positioned in a film receiving position in a camera, the rollers are frictionally driven by drive rollers associated with the camera to advance the film into the enclosure. The film sheet is automatically positioned in the enclosure when the trailing end of the film exits from the drive rollers, and the lead end of the film protrudes slightly from the resilient light seal and the enclosure. Thereafter the cassette may be removed from the camera and transported to a processor unit where the lead end of the film is inserted into a pair of drive rollers of the processor unit for extracting the film from the cassette and advancing it into the process unit for development.

Other objects, features and advantages of the invention will appear hereinafter as the description proceeds.

IN THE DRAWING

DESCRIPTION OF THE PREFERRED EMBODIMENT

Figure 2:
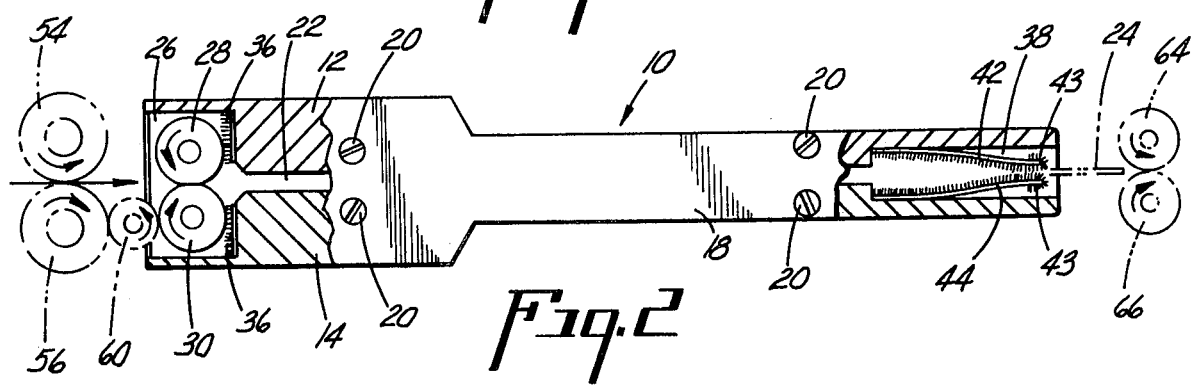
FIG. 2 is a front elevation, partially in section, of the film cassette and also illustrates schematically drive roller means for inserting and extracting a film sheet into and from the cassette.

As shown in the drawings, a film cassette is indicated generally by the reference numeral 10 and comprises a top wall 12 and a symmetrical bottom wall 14 secured to a pair of symmetrical side walls 16 and 18, as with fastening means 20, to provide a light-tight dark enclosure. As shown in FIG. 2, the top wall 12 and the bottom wall 14 provide a space 22 therebetween for receiving a sheet of photographic film 24 shown in phantom in FIG. 2.

The cassette 10 includes a film sheet ingress end comprising an opening 26 provided by recessing the top and the bottom walls 12 and 14 respectively. A pair of rollers 28 and 30 are mounted in frictional rolling contact within the opening 26, and the rollers are rotatably supported in the side walls 16 and 18 as shown in FIG. 1.

Figure 1:
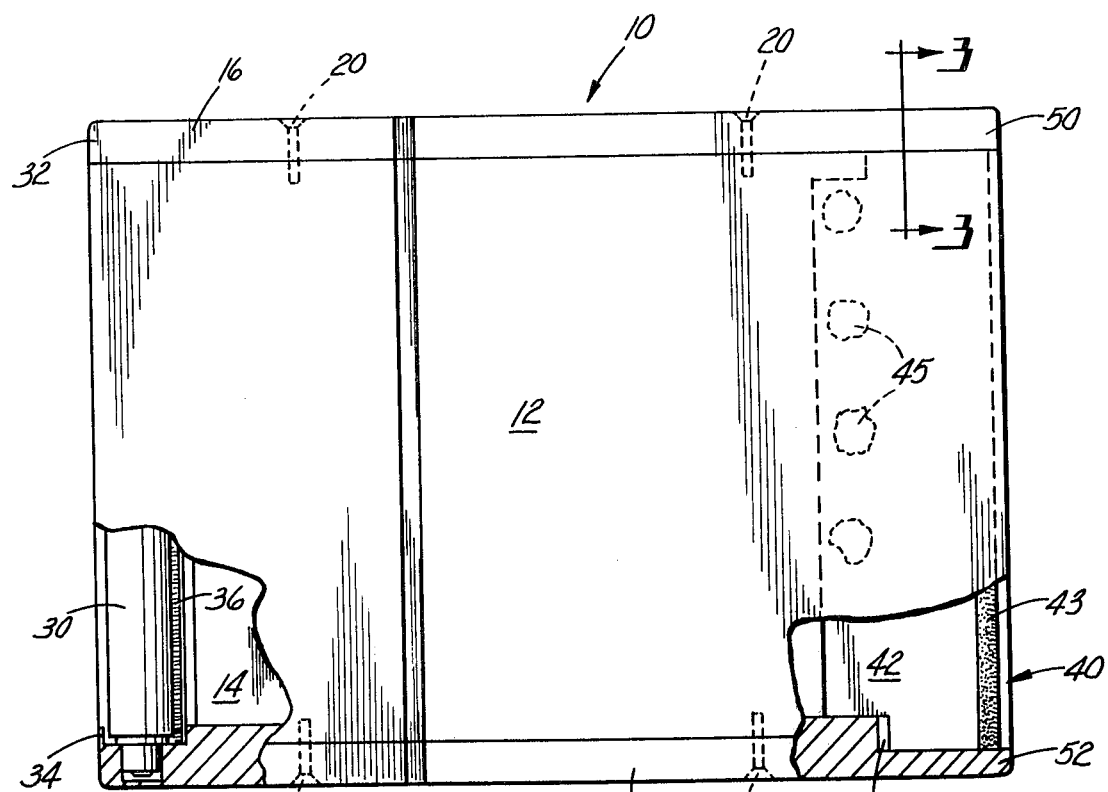
FIG. 1 is a plan view, partially in section, of a film cassette in accordance with the present invention.

The rollers 28 and 30 are positioned such that their peripheries are closely adjacent to ends 32 and 34 of the side walls 16 and 18 respectively, and the ends 32 and 34, as shown in FIG. 1, extend inwardly from the side walls to shield the ends of the rollers 28 and 30 and prevent ambient light from entering the interior of the cassette 10.

To further shield the interior of the cassette against ambient light, a strip 36 of opaque material may be provided in each of the recesses provided in the top wall 12 and the bottom wall 14, at positions in the upper and lower rear corners of the opening 26, as shown in FIG. 2. The strips 36 may be in the form of a velvet ribbon adhesively held in place.

At the other or film sheet egress end of the cassette, each of the top and bottom walls 12 and 14 respectively, are recessed to provide an opening 38, as shown in FIG. 2. Mounted within the opening 38 is a resilient light seal indicated generally by the reference numeral 40.

The resilient seal 40 comprises a leaf spring 42 secured at one marginal edge to the top wall 12 and extending downwardly and outwardly terminating at a position adjacent the egress end. A similar leaf spring 44 is secured at one marginal edge to the bottom wall 14 and extends upwardly and outwardly terminating at a position in contact engagement with the terminal edge of the leaf spring 42. The leaf springs 42 and 44 may be secured in place as by bonding with an adhesive as shown at 45 in FIG. 1.

Figure 3:
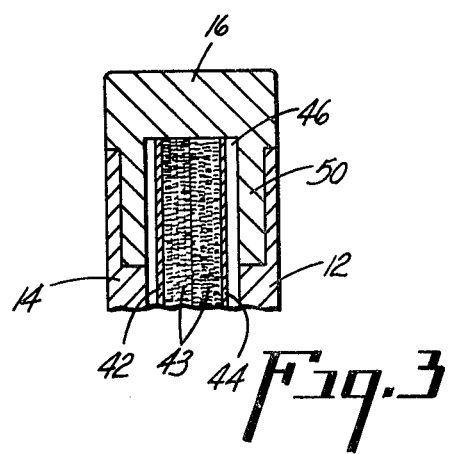
FIG. 3 is a section taken on the line 3—3 of FIG. 1.

As shown in FIGS. 1 and 3, the leaf springs 42 and 44 extend laterally a distance substantially the full width of the cassette 10. The lateral ends of the leaf springs 42 and 44 project into recesses 46 and 48 provided in the side walls 16 and 18, respectively. This arrangement, and as with the ingress end of the enclosure, providing ends 50 and 52 extending inwardly from the side walls 16 and 18 respectively, to shield the ends of the leaf springs 42 and 44, prevents ambient light from entering the interior of the enclosure.

The leaf springs 42 and 44 are also covered with an opaque or velvet material 43 to afford a light-tight seal at the egress end of the cassette to prevent exposure of a film sheet within the cassette to ambient light. In operation, the leaf springs 42 and 44 are adapted to flex apart in response to passage of a film sheet 24 therebetween, and to remain in contact with the surfaces of the film so long as the film is positioned within the cassette 10. Because the leaf springs 42 and 44 are velvet covered, there is no danger of marring the film surfaces during passage of the film sheet between the leaf springs.

With reference to FIG. 2, there is shown schematically a pair of driven feed rollers 54 and 56 for discharging an exposed film sheet from a camera. A further roller 60 is mounted intermediate the roller 56 and the roller 30 of the cassette 10, and the roller 60 is driven by the roller 56 to frictionally drive the roller 30. Thus, with the cassette positioned in a film receiving position, as the film sheet is discharged from the camera it is inserted and advanced into the enclosure by the rotating rollers 28 and 30.

As the trailing end of the film sheet enters the enclosure, the film is automatically positioned therewithin with a lead end of the film protruding from the egress end a distance of about ¾ to 1 inch (1.90 cm to 2.54 cm.), as shown in FIG. 2.

With the film positioned within the enclosure, the cassette 10 may be carried to a film processing unit with no danger of exposing the film to ambient light and without the need for a darkroom. At the processing unit the cassette is placed in a film extracting position and the lead end of the film sheet is grasped by a pair of driven rollers 64 and 66 which withdraw the film from the cassette and deliver it to a developer station of the processing unit. Thereafter, the developed film sheet may be deposited in an external output hopper.

From the foregoing, it will be appreciated that the invention provides a film cassette of simple construction which is economical to manufacture. The cassette is also convenient to use and provides a reliable device to protect the film sheet from exposure to ambient light during transport of the film from a camera to a processor unit. The arrangement of the rollers at the ingress end of the enclosure and the resilient light seal means at the egress end of the enclosure provide highly reliable means for inserting, guiding and positioning the film sheet within the cassette and, also, afford light-tight means to protect the film during transport of the cassette and withdrawal of the film therefrom.

This invention has been described with reference to certain specific embodiments and to various suggested methods of operation. However, other embodiments can be utilized in order to achieve the results provided by this invention. It is therefore intended that this invention is not to be limited except as defined in the following claims.

What is claimed is:

1. A cassette for transporting a film sheet from one station to another without exposing the film sheet to ambient light comprising:
    an enclosure having film sheet ingress and egress ends including top and bottom walls secured to a pair of side walls;
    a pair of rollers mounted at the ingress end of the enclosure affording a light seal and adapted for receiving and advancing a film sheet into the enclosure;
    resilient means mounted at the egress end of the enclosure providing a light seal for exiting of a film sheet from the enclosure;
    said rollers adapted to advance a film sheet into the enclosure in response to rotation of at least one of the rollers.

2. A cassette according to claim 1 wherein said resilient means are fabricated of a material which will not mar said film sheet.

3. A cassette according to claim 1 in which said resilient means comprises a pair of leaf springs forming a closed end adjacent the egress end of the enclosure, said leaf springs being flexed to an open position by a film sheet passing therebetween while remaining in contact with both surfaces of the film sheet to prevent exposure thereof to ambient light.

4. A cassette according to claim 3 in which said leaf springs are covered with an opaque material to prevent leakage of ambient light into the enclosure and to prevent marring of the film sheet surfaces.

5. A cassette according to claim 1 wherein said light seal afforded by said pair of rollers is afforded in part by an opaque material secured to said ingress end adjacent the non-abutting portion of the periphery of said pair of rollers.

6. A cassette according to claim 1 in which a film sheet fed into said enclosure is positioned with a lead end thereof protruding from the egress end of the enclosure to provide for removal of the film sheet from the enclosure.

7. A cassette according to claim 1 in which said pair of rollers are in peripheral driving contact with each other, and are adapted to be rotated by a driven roller means positioned externally of said enclosure and in frictional driving contact with at least one of the rollers of said pair of rollers.

8. A cassette for transporting a photographic film sheet from a camera for exposing the film sheet to a film processor for developing the exposed film sheet while maintaining the film sheet against exposure to ambient light comprising:
    a dark enclosure having a film sheet ingress end and a film sheet egress end including a top and a bottom wall secured to a pair of side walls;
    a pair of rollers in frictional rolling engagement mounted at the ingress end of said enclosure affording a light seal and adapted for receiving an exposed film sheet from a camera and advancing the film sheet into said enclosure; and leaf spring means mounted between the top and the bottom walls at the egress end of said enclosure affording a light seal for exiting of an exposed film sheet from said enclosure to a film processor.

9. A method of transporting a film sheet from one station to another without exposing the film sheet to ambient light, comprising the steps of:

providing a dark enclosure having an ingress end for receiving a film sheet for entry into the enclosure and an egress end for exiting of the film sheet from the enclosure;

receiving and advancing said film sheet into said dark enclosure by means of roller means in the dark enclosure affording a light seal at the ingress end thereof;

exiting a lead end of said film sheet from said dark enclosure while maintaining a light seal upon the portion of said film sheet remaining in said dark enclosure by means of resilient means at the egress end thereof.

10. A method according to claim 9 comprising the further step of: presenting said lead end of said film sheet to a driven roller means for withdrawing said film sheet from said enclosure.

* * * * *

UNITED STATES PATENT AND TRADEMARK OFFICE
CERTIFICATE OF CORRECTION

PATENT NO. : 4,008,483
DATED : February 15, 1977
INVENTOR(S) : William R. Swift, James Michael Marsh, Clyde E. LeFevre It is certified that error appears in the above-identified patent and that said Letters Patent are hereby corrected as shown below:

Column 1, line 49, delete the word "now" and insert "not"

Signed and Sealed this

Fourteenth Day of February 1978

[SEAL]

Attest:

RUTH C. MASON
Attesting Officer

LUTRELLE F. PARKER
Acting Commissioner of Patents and Trademarks